United States Patent [19]
Yagi et al.

[11] Patent Number: 6,100,524
[45] Date of Patent: Aug. 8, 2000

[54] TORSION TYPE PROBE AND SCANNING PROBE MICROSCOPE USING THE SAME

[75] Inventors: Takayuki Yagi, Yokohama; Shunichi Shido, Zama, both of Japan

[73] Assignee: Canon Kabushiki Kaisha, Tokyo, Japan

[21] Appl. No.: 09/050,932

[22] Filed: Mar. 31, 1998

[30] Foreign Application Priority Data

Apr. 1, 1997 [JP] Japan ................................ 9-099665

[51] Int. Cl.[7] ...................... H01J 37/00; G01N 13/10; G01B 5/28
[52] U.S. Cl. ................ 250/306; 250/307; 250/442.11; 73/105
[58] Field of Search ................. 250/306, 307, 250/442.11; 73/105

[56] References Cited

U.S. PATENT DOCUMENTS

| | | | |
|---|---|---|---|
| 4,367,504 | 1/1983 | Seki et al. | 360/109 |
| 5,187,367 | 2/1993 | Miyazaki et al. | 250/306 |
| 5,313,451 | 5/1994 | Yagi et al. | 369/126 |
| 5,334,835 | 8/1994 | Nakayama et al. | 250/306 |
| 5,386,720 | 2/1995 | Toda et al. | 73/105 |
| 5,398,229 | 3/1995 | Nakayama et al. | 369/126 |
| 5,444,244 | 8/1995 | Kirk et al. | 250/306 |
| 5,454,146 | 10/1995 | Yagi et al. | 29/25.35 |
| 5,482,598 | 1/1996 | Isaka et al. | 204/129.55 |
| 5,574,279 | 11/1996 | Ikeda et al. | 250/306 |
| 5,808,977 | 9/1998 | Koyanagi et al. | 369/43 |
| 5,866,021 | 2/1999 | Yagi et al. | 216/84 |
| 5,883,705 | 3/1999 | Minne et al. | 355/71 |

FOREIGN PATENT DOCUMENTS

| | | |
|---|---|---|
| 7-065098 | 3/1995 | Japan . |
| WO 97/04283 | 2/1997 | WIPO . |

OTHER PUBLICATIONS

G. Binning, et al., "Surface Studies By Scanning Tunneling Microscopy", Physical Review Letters, vol. 49, No. 1, pp. 57–61 (Jul. 5–Dec. 27, 1982).

J. Bay, et al., "Micromachined AFM Transducer With Differential Capacitive Read–Out", Journal of Micromechanics and Microengineering, pp. 161–164 (1995).

M. Tortonese, et al., "Atomic Force Microscopy Using A Piezoresistive Cantilever", 1991 International Conference on Solid–State Sensors and Actuators, Digest of Technical Papers, pp. 448–451 (1991).

*Primary Examiner*—Bruce C. Anderson
*Assistant Examiner*—Nikita Wells
*Attorney, Agent, or Firm*—Fitzpatrick, Cella, Harper & Scinto

[57] ABSTRACT

A torsion type probe for scanning probe microscopes, especially for atomic force microscopes, includes a supporting block, a torsion beam device arranged on the supporting block, a thin-film plane plate rotatably supported by the torsion beam means, and a tip formed on the thin-film plane plate. The torsion beam device include a piezoresistor, which is preferably formed in the surface or lateral walls of the torsion beam device, to detect torsion of the torsion beam device as the probe scans the surface of a sample.

9 Claims, 8 Drawing Sheets

<111> FACE OF SILICON CRYSTAL

FIG. 3A
FIG. 3B
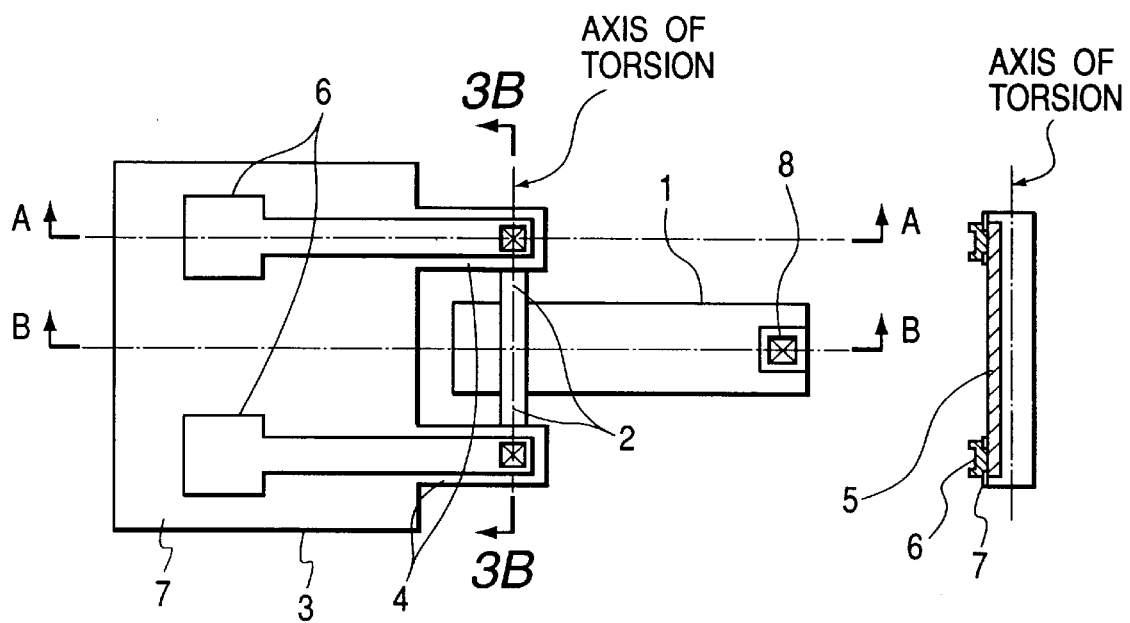
FIG. 4
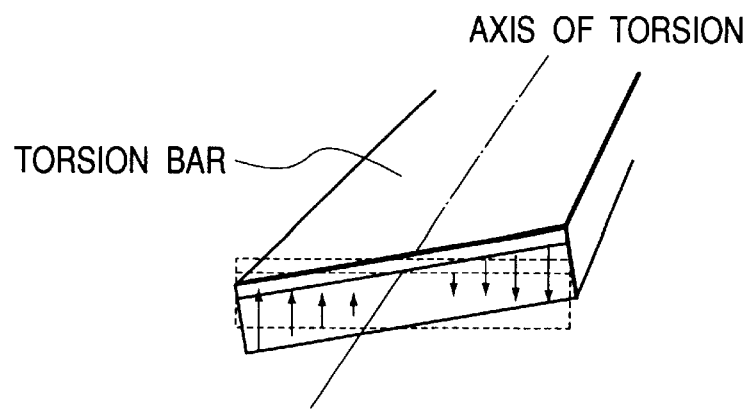

FIG. 5A
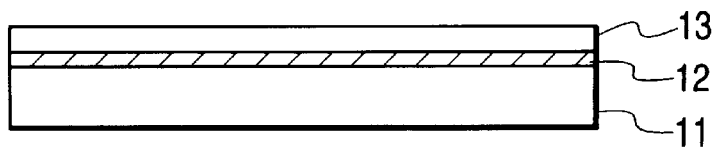
FIG. 5BA
A-A
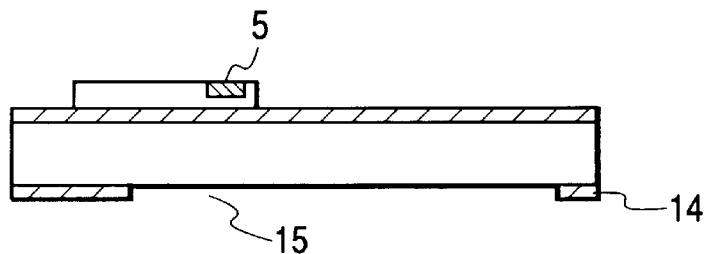
FIG. 5BB
B-B
FIG. 5CA
A-A
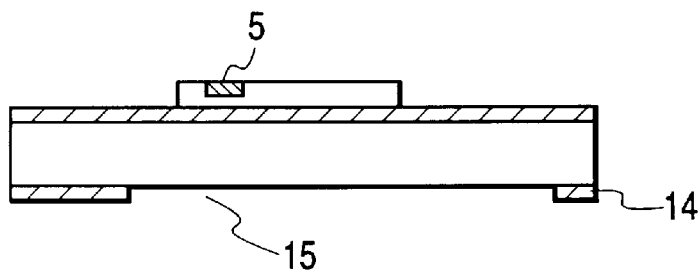
FIG. 5CB
B-B

TORSION TYPE PROBE AND SCANNING PROBE MICROSCOPE USING THE SAME

BACKGROUND OF THE INVENTION

1. Field of the Invention

This invention relates to a torsion type probe and a scanning probe microscope using the same.

2. Related Background Art

Thanks to the recent development of scanning tunneling microscopes (hereinafter referred to as "STMs") (G. Binnig et al., Phys. Rev. Lett., 49, 57 (1983)) adapted to directly observe the electron structure of surface atoms of conductors, the real space image of surface structure of a material can be viewed with an enhanced degree of resolution (i.e., in the order of angstroms) regardless if the material is monocrystalline or amorphous.

Currently, massive research efforts are being paid for developing scanning probe microscopes (hereinafter referred to as "SPMs") because of their effectiveness in the evaluation of microstructures. Scanning probe microscopes for detecting the surface profile of microstructures include scanning tunneling microscopes (STMs), atomic force microscopes (AFMs), magnetic force microscopes (MFMs) and scanning near-field optical microscopes (SNOMs) that respectively utilize the tunneling current, the atomic force, the magnetic force and the light obtained by bringing a probe having a microtip (microstylus) close to the sample surface to be observed.

Of these SPMs, the AFM uses a probe comprising a thin-film cantilever and a microtip mounted on the front end of the cantilever and detects the surface profile of the sample by detecting the displacement of the thin-film cantilever due to the repulsive or attractive force interacting between the microtip and the surface of the sample. It is highly effective for detecting the surface profile of a sample regardless if the sample is a conductor or insulator of electricity and hence has been studied intensively because of the wide variety of applications it provides.

The most popular technique used for the AFM to detect the surface profile of the sample is the optical lever method using a binary position sensitive detector (PSD) that detects the displacement of the optical path due to the force applied by the sample.

However, with the probe using a thin-film cantilever, the thin-film cantilever is subjected not only to vertical force but also to horizontal force (frictional force) at the same time so that the three-dimensional profile of the sample cannot be accurately traced from the detected binary PSD signal. Therefore, with detecting systems utilizing the optical lever method, the binary PSD is modified to a quarternary PSD to observe the displacement of the cantilever by dividing it into a component that is vertical relative to the surface of the sample (deflective displacement) and a component that is horizontal relative to the surface (torsional displacement) so that the three-dimensional surface profile of the sample may be observed highly accurately from the detection signal of the deflective displacement.

With a known method for detecting the displacement of the probe due to the force vertical to the surface of the sample, the probe of the thin-film cantilever is modified to a torsion type probe comprising a thin-film having a plane section rotatably supported by a pair of torsion beams (or collectively referred to as "torsion beam means"). A torsion type probe has a structure hardly affected by any torsional displacement because it is mainly displaced by the torsion on the part of the torsion beams.

Another known method of detecting displacements observes the deflection of a lever of measuring system by detecting the electric capacitance between the lever and electrodes (J. Brugger, et al., "Capacitive AFM microlever with combined integrated sensor/actuator functions", The 7th International Conference on Solid-State Sensors and Actuators (Transducers '93), p.1044 (1993)). This capacitance detection method does not depend on the shape of the lever and is adapted to detect the displacement of a torsion type probe (J. Bay, et al., "Micromachined AFM transducer with differential capacitive read-out", J. Micromech. Microeng., 5 (1995) pp.161–165). Additionally, unlike an optical lever method using an optical system including a light source, a light path and a position sensitive detector, it does not require the use of any optical system and hence is free from space-related restrictions that may arise from the alignment of the optical axis and the size of the sample to be observed.

Still additionally, it is highly adapted to the process of manufacturing semiconductor integrated circuits because the displacement sensor can be prepared by micromachining and a plurality of such sensors can be arranged on a single chip. However, the lever should be placed as close as possible to the detection electrodes while maximizing the surface area of the electrodes and the parasitic capacitance of the lever and the detection circuit should be minimized in order to achieve a satisfactorily high detection sensitivity with this method.

Generally speaking, the resonant frequency of the lever should be raised to decrease its response to the noise of external disturbance and vibrations and increase the scanning speed. However, an increased surface area of the lever and that of the detection electrodes in turn reduce the resonant frequency of the lever so that downsizing is disadvantageous for the displace detection method in terms of detection sensitivity and SN ratio.

The piezoresistance method is a method of detecting the change in the resistance of a piezoresistor formed in a thin-film cantilever to see the displacement of the latter and, like the capacitance detection method, it is also free from space-related restrictions. Piezoresistive AFMs utilizing this method are known (M. Tortonese et al., "Atomic force microscopy using a piezoresistive cantilever", Transducers '91, pp.448–451 (1991)).

A piezoresistive AFM provides a high detection sensitivity and a resolution in the order of angstroms.

A method of preparing a piezoresistive cantilever for a piezoresistive AFM will be described by referring to FIGS. 1A through 1C of the accompanying drawings.

The starting material is an SOI (silicon on insulator) wafer formed by arranging a silicon layer 504 on a silicon wafer 502 with a silicon dioxide separation layer 503 interposed therebetween (FIG. 1A) and then another silicon dioxide layer 505 is formed on the rear surface of the SOI wafer.

Then, a piezoresistor layer 506 is formed in the surface of the silicon layer 504 by implanting boron ions into the silicon layer by means of an ion implantation technique and a cantilever is formed from the silicon layer by patterning, using photolithography and etching. An opening 507 is formed through the silicon dioxide layer 505 on the rear surface of the wafer also by patterning.

Thereafter, a silicon dioxide thin film 508 is formed on the surface of the cantilever. Subsequently, a contact hole 509 is formed and then Al electrodes 510 are formed to detect the change in the resistance of the piezoresistive layer (FIG. 1B).

After applying polyimide to the surface of the wafer by spinning to form a polyimide layer and hardening it, the wafer is subjected to crystal anisotropic etching from the opening on the rear surface of the wafer, using an EDP (ethylene diamine pyrocathecol) aqueous solution, to produce a support member 511. Finally, the separation layer 503 and the polyimide layer are removed (FIG. 1C) to produce a piezoresistive cantilever having a plan view as shown in FIG. 2.

Such a piezoresistive cantilever shows an excellent reproducibility because it can be prepared by utilizing a process of manufacturing a semiconductor integrated circuit. Therefore, it is possible to provide a cantilever carrying a plurality of displacement sensors on a single chip.

Additionally, the piezoresistive method is less subjected to restrictions to downsizing of the cantilever when compared with the capacitance detection method and it is possible to provide a cantilever having a resonant frequency of more than 10 kHz with a detection sensitivity comparable to that of an optical lever method.

However, known piezoresistive AFMs utilize a thin-film cantilever and hence, when the surface of a sample is scanned by the cantilever to detect the profile of the sample, the signal representing the change in the resistance of the piezoresistor actually includes both the change due to the deflectional displacement of the cantilever and the change due to the torsional displacement of the cantilever.

Therefore, the piezoresistive cantilever of any known piezoresistive AFM cannot discriminate the change in the resistance due to the deflectional displacement of the cantilever from the change due to its torsional displacement to accurately detect the surface profile of a sample.

SUMMARY OF THE INVENTION

In view of the above identified problem of known piezoresistive AFMs, it is therefore the object of the present invention to provide a small and highly sensitive probe that can accurately detect the torsional displacement of a cantilever and also a scanning probe microscope comprising such a probe.

According to the invention, the above object is achieved by providing a torsion type probe comprising:

a supporting block;

torsion beam means arranged on the supporting block;

a thin-film plane plate rotatably supported by the torsion beam means; and a tip formed on the thin-film plane plate, wherein a piezoresistor is arranged in the torsion beam means.

According to another aspect of the invention, there is provided a scanning probe microscope for detecting the surface profile of a sample by way of a probe by causing the probe and the sample to scan each other, the microscope comprising:

a probe as defined above;

a scan mechanism for moving the probe and the sample relative to each other to cause them to scan each other; and means for detecting a signal representing the change in the resistance of the piezoresistor, wherein the signal represents the surface profile of the sample.

BRIEF DESCRIPTION OF THE DRAWINGS

FIGS. 3A and 3B are a schematic plan view and a schematic cross sectional view of the piezoresistive cantilever of Example 1.

FIG. 4 is a schematic illustration of the principle underlying the detection of a torsional displacement of the torsion bar of Example 1.

DESCRIPTION OF THE PREFERRED EMBODIMENTS

Figure 1A:
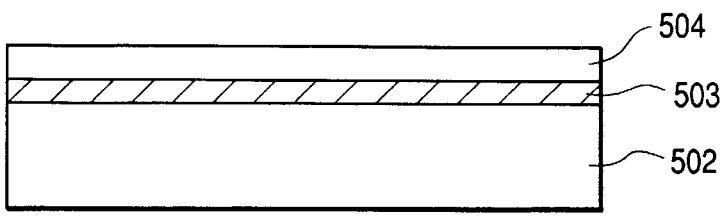
FIGS. 1A, 1B and 1C are schematic cross sectional views of a known piezoresistive cantilever in different manufacturing steps.
Figure 1B:
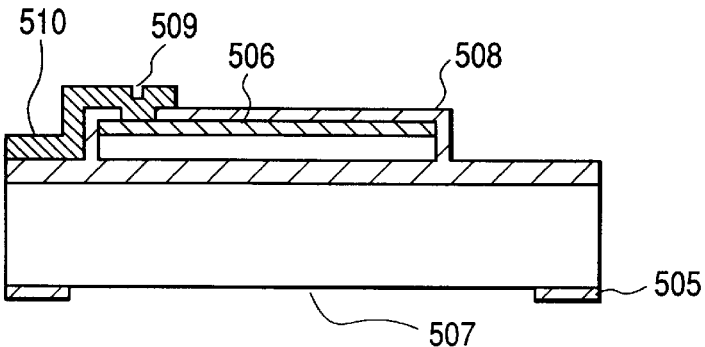
Figure 1C:
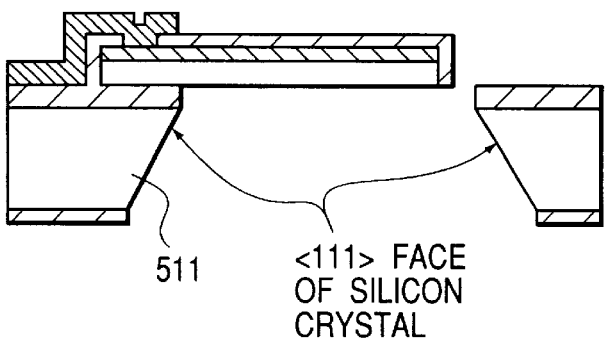
Figure 2:
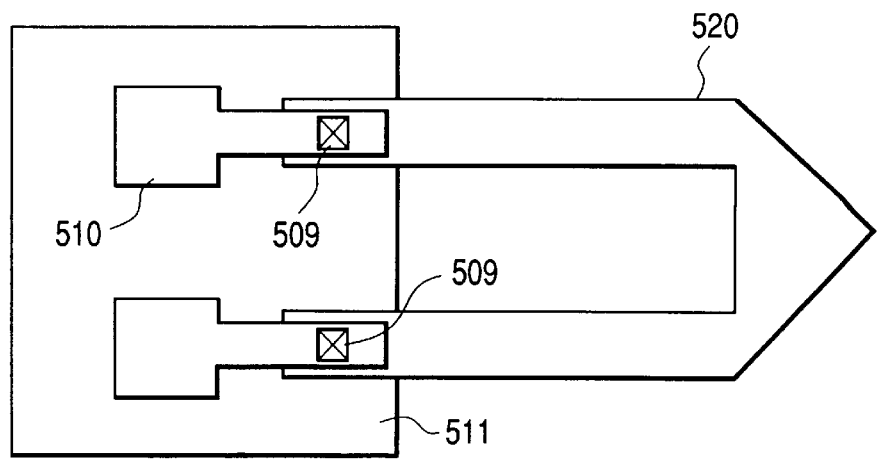
FIG. 2 is a schematic plan view of a known piezoresistive cantilever.

Now, the present invention will be described by way of examples.

EXAMPLE 1

Referring to FIGS. 3A and 3B, the probe prepared in this example comprised a thin-film plane plate 1, a pair of torsion bar sections 2 supporting the thin-film plane plate 1, a supporting block 3, thin film supporting sections 4 formed in the supporting block, a piezoresistor 5 arranged in the torsion bar sections and electrodes 6 electrically connected to observe the resistance of the piezoresistor 5.

The supporting block and the thin-film supporting sections are electrically insulated from the electrodes by means of an insulation layer 7. The piezoresistor is evenly buried into the torsion bar sections near the surface of the latter and arranged symmetrically relative to the axis of torsion of the thin-film plane plate. While the piezoresistor is formed partly in the thin-film plane plate in FIGS. 3A and 3B, a torsional displacement takes place only within the torsion bar sections. The probe has a tip 8 arranged at the front end of the thin-film plane plate and, as the surface of the sample is scanned by means of the probe, the thin-film plane plate is subjected not only to vertical force but also to horizontal force (frictional force) at the same time. However, it will be appreciated that, since the probe according to the invention is realized in the form of a thin-film plane plate rotatably supported by torsion beam means (a pair of torsion bar sections), the displacement of the probe is limited only to the direction in which the torsion beam means is torsionally rotated.

Consequently, the three-dimensional surface profile of the sample can be accurately traced from the displacement detection signal of the probe.

Now, the principle underlying the detection of a torsional displacement of the torsion bar (each torsion bar section) of Example 1 will be described by referring to FIG. 4.

As the torsion bar is torsionally displaced (from a state as shown by dotted lines to a state indicated by solid lines), the torsion bar is twisted around the axis of torsion to generate stress in it, the magnitude of which stress is proportional to the distance from the axis of torsion (as schematically represented by the lengths of the arrows in FIG. 4). Thus, the torsion bar is distorted according to the differentiated stress as a function of the distance from the axis of torsion.

The piezoresistor changes its electric resistance to reflect the distortion so that the latter can be determined by observing the change in the resistance of the piezoresistor.

More specifically, since the magnitude of the distortion of the torsion bar is substantially proportional to the distance from the axis of torsion as pointed out above, the torsional displacement of the torsion bar can be determined by observing the change in the resistance of the piezoresistor if the latter is arranged in the surface of the torsion bar.

FIGS. 5A through 5FB are schematic cross sectional views of the probe of Example 1 in different manufacturing steps, each being taken along line A—A or line B—B in FIG. 3A.

Now, the steps of preparing the probe of this example will be described by referring to FIGS. 5A through 5FB.

An SOI (silicon on insulator) wafer comprising a silicon wafer 11 and an n-type silicon layer 13 formed thereon with a silicon dioxide separation layer 12 interposed therebetween was used as starting wafer (FIG. 5A). Then, the SOI wafer was thermally oxidized by means of oxidizing gas to produce silicon dioxide and the silicon dioxide on the surface was removed by means of HF aqueous solution in such a way that a silicon dioxide film layer 14 was left on the rear side of the wafer.

Then, a pattern of photoresist was formed by photolithography and boron ions were implanted into the surface of part of the silicon layer 13 by means of an ion implantation technique, using the patterned photoresist as a mask.

Subsequently, the photoresist was removed and the boron ions were thermally diffused into a neighboring area of the surface of the silicon layer, followed by annealing, to produce a piezoresistor 5. Then, the silicon layer was processed to take the form of a probe as shown in FIG. 3A by patterning by means of photolithography and reactive ion etching (RIE) using $SF_6$ gas.

Then, an opening 15 was formed by patterning the silicon dioxide film 14 on the rear side by means of photolithography and etching using HF aqueous solution (FIGS. 5BA and 5BB). Thereafter, a PSG (phospho-silicate glass) film 16 was formed on the surface of the cantilever by means of CVD (chemical vapor deposition) (FIGS. 5CA and 5CB).

Figure 5D:
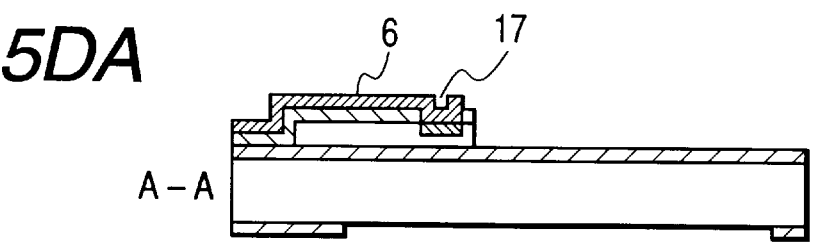
FIGS. 5A, 5BA, 5BB, 5CA, 5CB, 5DA, 5DB, 5EA, 5EB, 5FA and 5FB are schematic cross sectional views of the probe of Example 1 in different manufacturing steps.
Figure 5D:
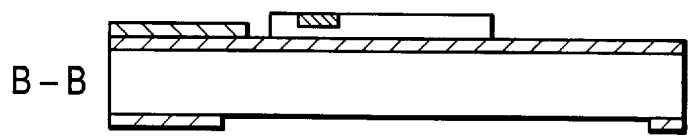

A contact hole 17 was formed in the PSG film also by means of photolithography and etching using HF aqueous solution and then an Al film was formed thereon by sputtering. A pair of electrodes 6 were produced out of the Al film by means of photolithography and an Al etchant containing phosphoric acid as principal ingredient to draw out the change in the resistance of the piezoresistive layer to the outside (FIGS. 5DA and 5DB).

Then, a tip was formed at the front end of the thin-film plane plate.

The method of preparing a microtip (microstylus) as disclosed in Japanese Patent Application Laid-Open No. 06-084455 was used for forming the tip. Cr and Au layers were sequentially formed as bonding layer 18 in FIG. 5EB to respective thicknesses of 5 nm and 100 nm by means of an electron beam evaporation system and then patterned by means of photolithography and an Au etchant containing iodine and potassium iodide. Then, a 1 μm thick Au film was formed on a female mold substrate by means of a resistance heating evaporation system and patterned to produce an Au tip 8 on the female mold substrate.

Figure 5E:
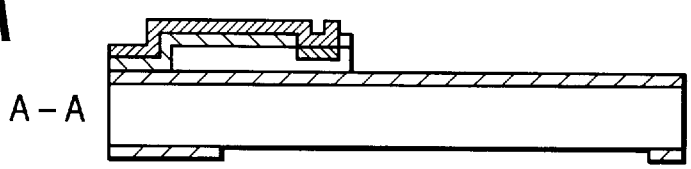
Figure 5E:
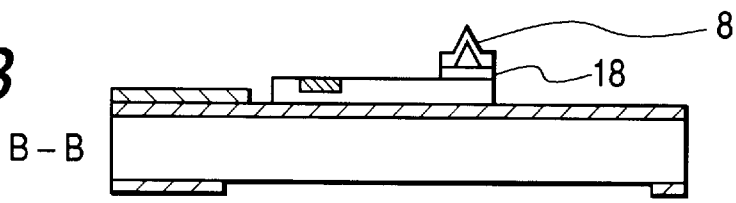
Figure 5F:
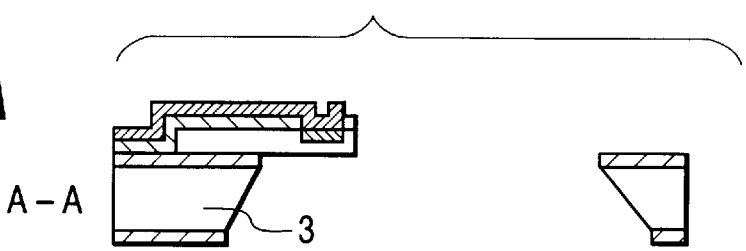
Figure 5F:
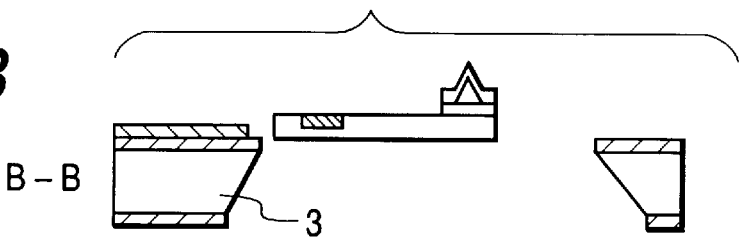

The tip was then transferred and bonded to the bonding layer and peeled off from the female mold substrate to provide the thin-film plane plate with the tip at the front end thereof (FIGS. 5EA and 5EB).

In the last step, after forming a resin layer on the surface of the wafer by spinning and hardening the resin layer, the wafer was subjected to crystal anisotropic etching from the opening at the rear side of the wafer, using EDP aqueous solution to produce a supporting block 3 and the separating layer 12 was removed from the rear side by means of HF aqueous solution. Finally, the resin layer was removed by means of a plasma ashing system (FIGS. 5FA and 5FB) to produce a probe comprising torsion beam means and a piezoresistor carried by the torsion beam means as shown in FIGS. 3A and 3B.

Subsequently, an AFM apparatus was prepared by using the probe of this example.

Figure 6:
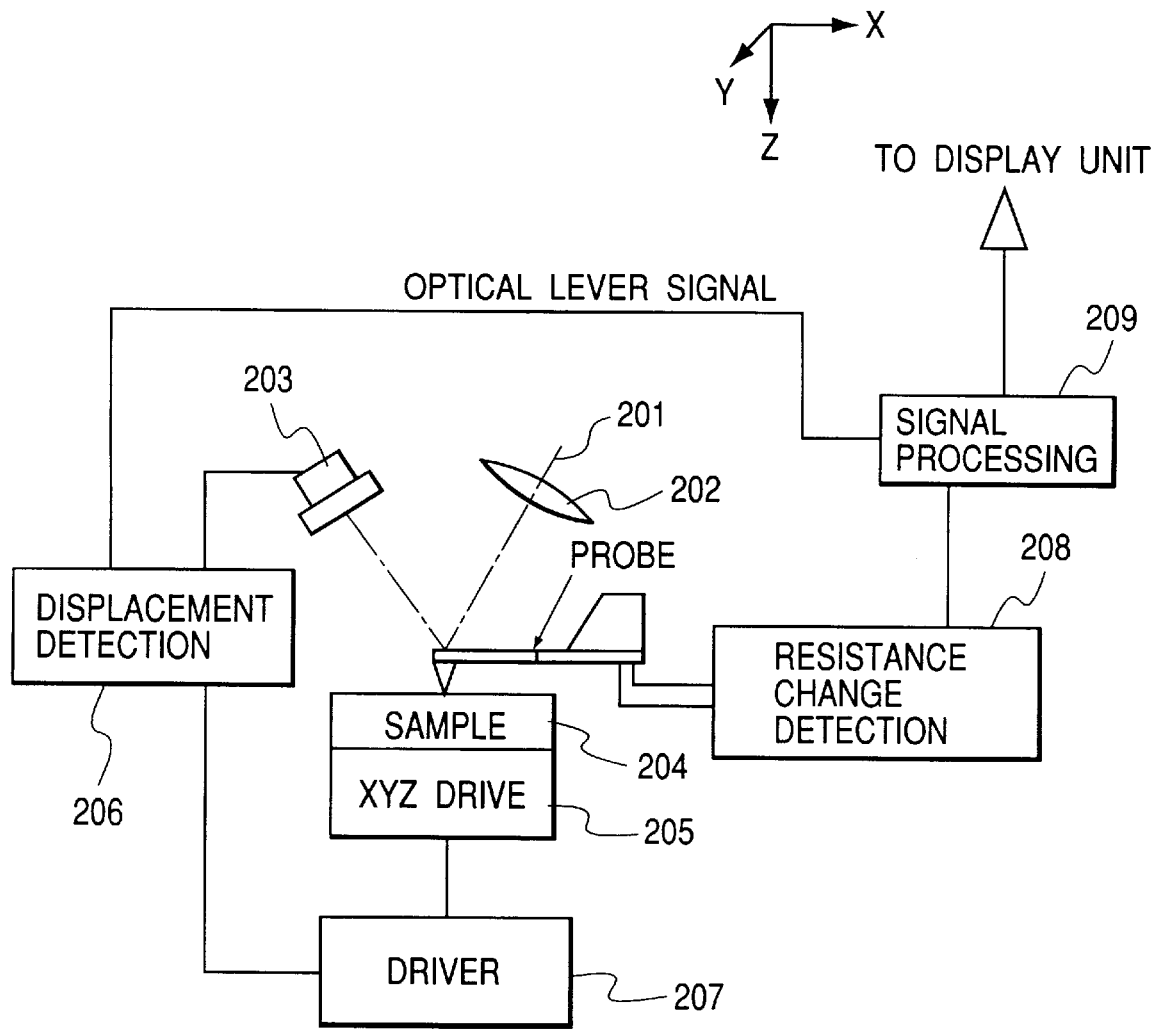
FIG. 6 is a schematic block diagram of an AFM apparatus comprising the probe of Example 1.

FIG. 6 is a schematic block diagram of the apparatus.

The AFM apparatus comprised the above described probe in addition to a lens 202 for focusing a laser beam 201 on the rear surface of the thin-film plane plate, a quarternary position sensitive detector (PSD) 203 for detecting the change in the angle of reflection of light due to the displacement of the thin-film plane plate, a displacement detection circuit 206 for detecting the displacement from the signal transmitted from the PSD, an XYZ axes drive piezoelectric device 205 and an XYZ driver 207 for driving the XYZ axes drive piezoelectric device 205 in the directions of the X, Y and Z axes. It additionally comprises a change-of-resistance detection circuit 208 for detecting the change in the resistance of the piezoresistor of the probe and a signal processing circuit 209. The signal processing circuit also receives optical lever signals from the displacement detection circuit 206 so that the signal from the quarternary PSD can be divided into a signal component representing the component of the displacement of the probe vertical to the surface of the sample 204 and a signal component representing the component of the displacement of the probe horizontal to the surface of the sample as the signals are appropriately processed by the signal processing circuit. The processed output signals are then transmitted to a display unit.

In an experiment, the probe was moved close to a sample of mica and then the XYZ axes drive piezoelectric device was driven in the X and Y directions to obtain a stepped image of the mica represented by the displacement of the probe in the direction vertical to the surface of the sample as detected by the PSD and the signal representing the change in the resistance of the piezoresistor.

Subsequently, the sample was brought closer to the probe and the XYZ axes drive piezoelectric device was driven in the Z direction to move the sample up and down and displace the probe. As a result, a signal representing the up and down movement of the sample was obtained from the change-of-resistance detection circuit 208. Meanwhile, the displacement of the probe parallel with the surface of the sample that had occurred when the XYZ axes drive piezoelectric device had been driven in the X and Y direction to obtain the surface profile of the mica sample was detected by the PSD and found within the permissible range for noise. Obviously, this is due to the structure of the torsion type probe that is mainly displaced by torsional rotation of the torsion beam means and hence hardly displaced in the direction parallel to the surface of the sample.

From the obtained result of the experiment, it was evidenced that a probe according to the invention is adapted to observe only the change in the resistance of its piezoresistor due to its displacement along a direction vertical relative to the surface of the sample and that an AFM apparatus comprising a probe according to the invention is effective to accurately observe the three-dimensional surface profile of a sample.

EXAMPLE 2

Figure 7A:
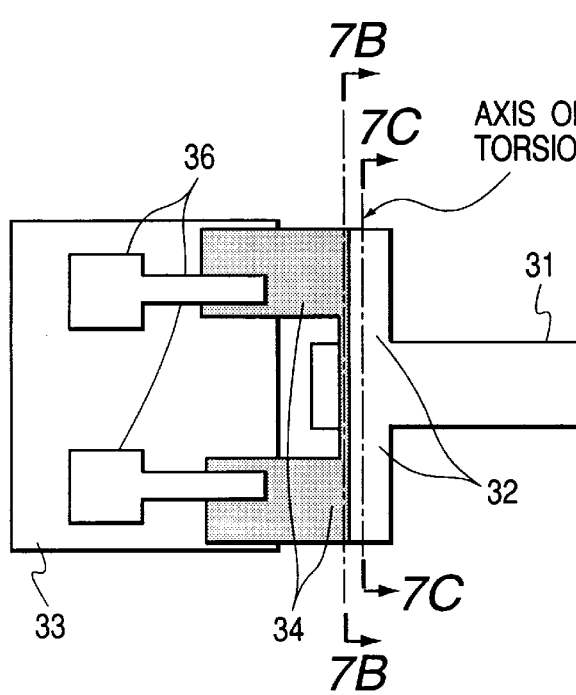
FIGS. 7A, 7B and 7C are a schematic plan view and schematic cross sectional views of the probe of Example 2.
Figures 7B, 7C:
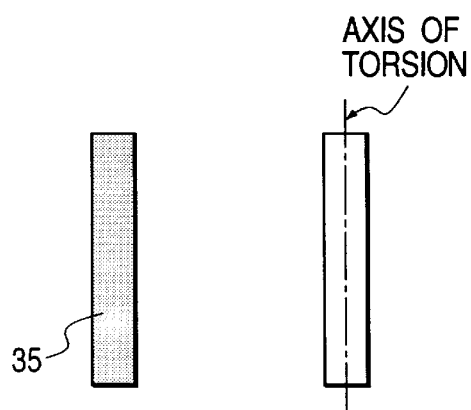

FIGS. 7A, 7B and 7C schematically show the probe prepared in this example. FIG. 7A is a schematic plan view of the probe of this example and FIGS. 7B and 7C are schematic cross sectional views taken along line 7B—7B and 7C—7C in FIG. 7A respectively.

As shown, the probe of this example comprises a thin-film plane plate 31, a pair of torsion bar sections 32 supporting the thin-film plane plate 31, a supporting block 33, thin film supporting sections 34 formed in the supporting block, a piezoresistor 35 arranged in the torsion bar sections and electrodes 36 electrically connected to observe the resistance of the piezoresistor 35.

The piezoresistor is evenly buried into the torsion bar sections in the direction of the height of the torsion bar sections along their lateral outer periphery. While the piezoresistor is formed partly in the thin-film plane plate in FIGS. 7A through 7C, a torsional displacement takes place only within the torsion bar sections.

No change will occur in the resistance if the thin-film supporting sections are deflected because the piezoresistor is formed evenly along the height of the thin-film supporting sections. Thus, it will be appreciated that, since the probe of this example is realized in the form of a thin-film plane plate rotatably supported by torsion beam means (a pair of torsion bar sections), the displacement of the probe is limited only to the direction in which the torsion beam means is torsionally rotated so that is is adapted to detect the displacement due to a force exerted in a direction vertical to the surface of the sample.

Consequently, the three-dimensional surface profile of the sample can be accurately traced from the displacement detection signal of the probe.

Now, the principle underlying the detection of a torsional displacement of the torsion bar (each torsion bar section) of this example will be described by referring to FIG. 8.

Figure 8:
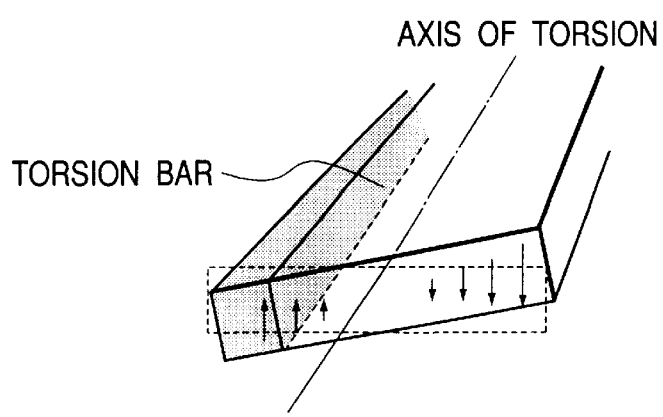
FIG. 8 is a schematic illustration of the principle underlying the detection of a torsional displacement of the torsion bar of Example 2.

As the torsion bar is torsionally displaced (from a state as shown by dotted lines to a state indicated by solid lines), the torsion bar is twisted around the axis of torsion to generate stress in it, the magnitude of which stress is proportional to the distance from the axis of torsion (as schematically represented by the lengths of the arrows in FIG. 8). Thus, the torsion bar is distorted according to the differentiated stress as a function of the distance from the axis of torsion.

The piezoresistor changes its electric resistance to reflect the distortion so that the latter can be determined by observing the change in the resistance of the piezoresistor.

More specifically, since the magnitude of the distortion of the torsion bar is substantially positively related to the distance from the axis of torsion as pointed out above, a large change can be produced in the resistance by forming the piezoresistor along the lateral outer periphery of the torsion bar.

Additionally, since the piezoresistor is evenly buried into the torsion bar in the direction of the height of the torsion bar, the resistance of the piezoresistor is not affected if the torsion bar is deflected so that only the change in the piezoresistance due to the torsional rotation of the torsion bar can be reliably detected.

The probe of this example was prepared by following the steps as described above for Example 1.

An n-type SOI (silicon on insulator) wafer same as the one used in Example 1 was used as a starting wafer and boron ions were implanted into the wafer by means of an ion implantation technique as in the step of FIGS. 5BA and 5BB, using a photoresist mask patterned to show the contour of the piezoresistor by means of photolithograpy as illustrated in FIG. 7A.

Note, however, that boron ions were thermally diffused in such a way that they show an evenly distributed resistivity along the height of the silicon layer. Thereafter, a probe was formed as in Example 1. Note that no PSG film was formed for an insulation layer in the probe of this example.

Since a resistor layer was evenly formed in the thin-film supporting section of the probe of this example, the step of forming and patterning an insulation layer 4 of Example 1 could be omitted to simplify the overall preparation process.

The probe of this example was mounted into the AFM apparatus of FIG. 6 and an experiment similar to that of Example 1 was carried out.

As a result, it was evidenced that a probe according to the invention is adapted to observe only the change in the resistance of its piezoresistor due to its displacement along a direction vertical relative to the surface of the sample and that an AFM apparatus comprising a probe according to the invention is effective to accurately observe the three-dimensional surface profile of a sample.

EXAMPLE 3

Figure 9A:
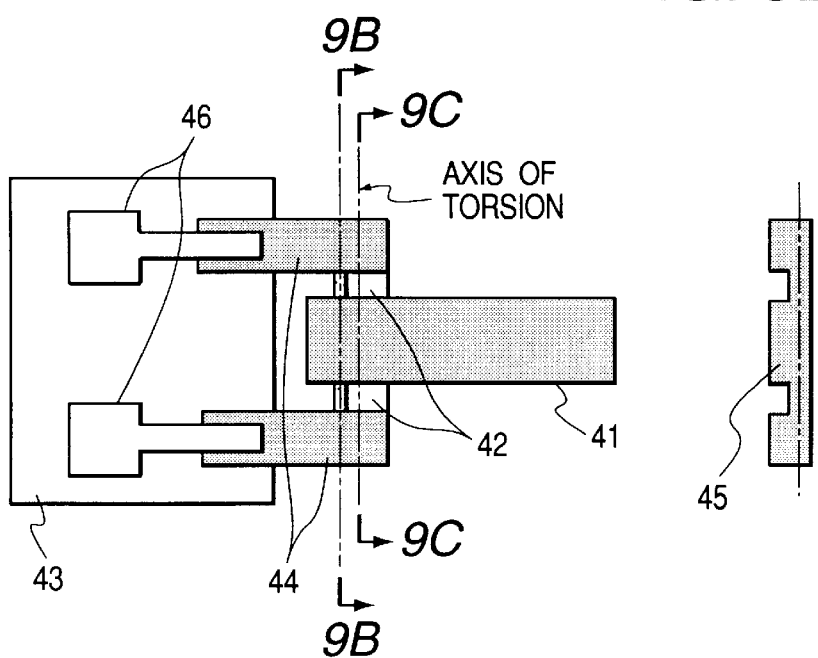
FIGS. 9A, 9B and 9C are a schematic plan view and schematic cross sectional views of the probe of Example 3.
Figures 9B, 9C:

FIGS. 9A, 9B and 9C schematically show the probe prepared in this example. FIG. 9A is a schematic plan view of the probe of this example and FIGS. 9B and 9C are schematic cross sectional views taken along line 9B—9B and 9C—9C in FIG. 9A respectively.

As shown, the probe of this example comprises a thin-film plane plate 41, a pair of torsion bar sections 42 having a smaller height and supporting the thin-film plane plate 41, a supporting block 43, thin film supporting sections 44 formed in the supporting block, a piezoresistor 45 arranged in the torsion bar sections and electrodes 46 electrically connected to observe the resistance of the piezoresistor 45.

The torsion bar sections have a height relatively small when compared with that of the thin-film supporting section and that of the thin-film plane plate. Thus, a relatively small value could be selected for the spring constant of the torsion bar sections of this probe as compared with its counterpart of Example 2. A small spring constant means that the probe of this example was adapted to observe the surface of organic materials and living samples that are soft and show a low yielding stress.

Additionally, the thin-film plane plate was less flexible since it was made relatively thick as compared with that of the torsion bar sections.

As in the case of Example 2, the piezoresistor is evenly buried into the torsion bar sections in the direction of the height of the torsion bar sections along their lateral outer periphery. A large change can be produced in the electric resistance to improve the detection sensitivity of the probe as the piezoresistor is arranged most remotely from the axis of torsion. While the effective portion of the piezoresistor was extending to part of the supporting block, the thin-film supporting sections and the thin-film plane plate, torsional displacement occurs exclusively in the torsion bar sections. Since the probe of this example comprised a thin-film plane plate rotatably supported by torsion beam means (a pair of torsion bar sections), the displacement of the probe is limited only to the direction in which the torsion beam means is torsionally rotated so that the probe is adapted to detect the displacement due to a force exerted in a direction vertical to the surface of the sample.

Consequently, the three-dimensional surface profile of the sample can be accurately traced from the displacement detection signal of the probe.

The probe of this example was prepared by following the steps as described above for Example 1.

An n-type SOI (silicon on insulator) wafer same as the one used in Example 1 was used as a starting wafer and boron ions were implanted into the wafer by means of an ion implantation technique as in the step of FIGS. 5AB and 5BB, using a photoresist mask patterned to show the contour of the piezoresistor by means of photolithograpy as illustrated in FIG. 9A. Note, however, that boron ions were thermally diffused in such a way that they show an evenly distributed resistivity along the height of the silicon layer.

After patterning the silicon layer to show the profile of the probe, the portion that became the torsion beam means was etched back to produce a thin film by means of RIE using $CF_4$ gas. Thereafter, a probe was formed as in Example 1. Note that no PSG film was formed for an insulation layer in the probe of this example.

Figure 10:
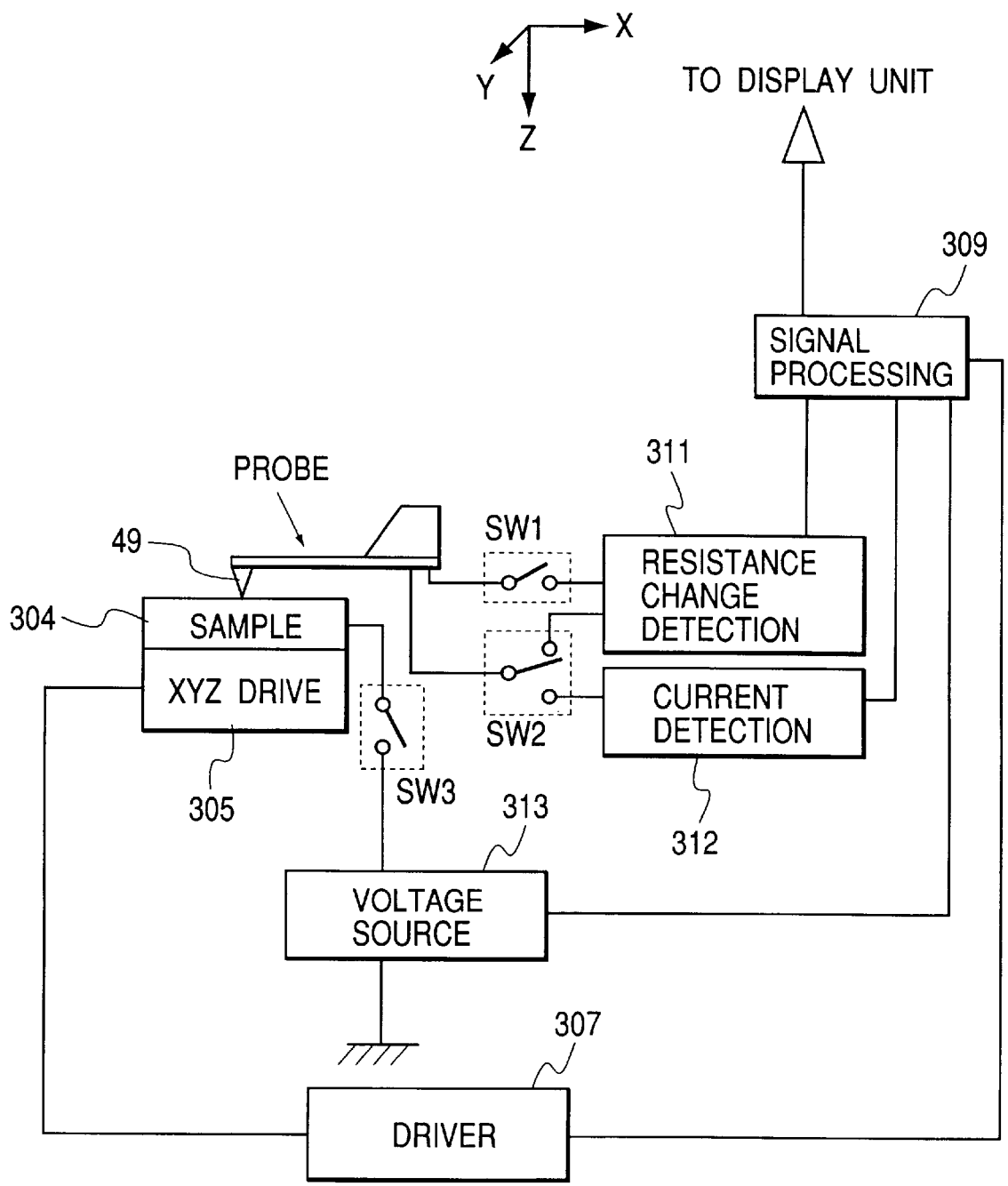
FIG. 10 is a schematic block diagram of an SPM apparatus comprising the probe of Example 3.

Subsequently, an AFM/STM apparatus, a type of SPM, was prepared by using the probe of this example. FIG. 10 is a schematic block diagram of the apparatus.

A tip was formed on the thin-film plane plate of the probe having a profile as shown in FIGS. 9A through 9C. The tip was an Au tip 49 prepared by means of a direct electron beam deposition method (as described in K. L. Lee et al., "Direct electron beam patterning for nanolithography", J. Vac. Sci. Technol. B7 (6), p.1941 (1989)).

The AFM/STM apparatus comprised the above described probe in addition to a change-of-resistance detection circuit 311 for detecting the change in the resistance of the piezoresistor of the probe, a voltage source 313 for applying a voltage between the sample 304 and the probe, a current detection circuit 312 for detecting the electric current flowing between the sample and the tip when the voltage is applied, a signal processing circuit 309 for processing the signals from the change-of-resistance detection circuit and the current detection circuit and transmitting its output to a display unit, an XYZ axes drive piezoelectric device 305 and an XYZ driver 307 for driving the XYZ axes drive piezoelectric device 305 in the directions of the X, Y and Z axes.

Switches SW1 and SW2 were arranged between the probe and the change-of-resistance detection circuit and the current detection circuit.

Referring to FIGS. 9A through 9C, the switches SW1 and SW2 were connected to the pair of electrodes 46 of the probe and were switched to turn on the change-of-resistance detection circuit in order to detect the change in the resistance of the piezoresistor due to the displacement of the probe.

Thus, the probe of FIGS. 9A through 9C could be used for the AFM as in Example 2.

With the probe of FIGS. 9A through 9C, the thin-film plane plate and the thin-film supporting sections were electrically connected to each other by way of the piezoresistor and the tip was formed directly on the thin-film plane plate. Accordingly, the tip and the electrodes 46 were also electrically connected. Thus, the electric current flowing between the sample and the tip could be observed as the SW1 was turned off and the SW2 was switch to turn on the current detection circuit, while SW3 between the sample and the voltage source was turned on to apply a constant voltage. Then, the surface profile of the sample could be observed by causing the XYZ axes drive piezoelectric drive in the X and Y directions.

Thus, the SPM of this example did not require any optical system including a light source, an optical path and a position sensitive detector of an optical lever method to obtain a topographic image of the sample so that it could also provide a piezoresistive AFM that was free from the space-related restrictions of conventional SPMs arising from the alignment of the optical axis and the size of the sample and adapted to detect the displacement of the probe perpendicular to the surface of the sample and obtain an accurate three-dimensional image of the sample. Additionally, it was also possible to detect the electroconductive property of the sample by electrically connecting the tip and the electrodes by way of the piezoresistor.

As discussed above in detail, a probe according to the invention comprises a piezoresistor arranged in torsion beam means (a pair of torsion bar sections) rotatably supporting a thin-film plane plate and adapted to detect the torsional rotation of the torsion beam means by detecting the change in the electric resistance of the piezoresistor so that the displacement of the probe due to the force existing between the probe and the sample and exerted in a direction vertical to the surface of the sample can be detected as the change in the resistance of the piezoresistor to accurately determine the surface profile of the sample.

Additionally, a probe according to the invention is a torsion type probe where a thin-film plane plate is rotatably supported by torsion beam means (a pair of torsion bar sections) so that the probe is mainly displaced in the direction of the torsional rotation of the torsion beam means and is free from the problem of torsional displacement that can be given rise to if such a displacement occurred in the cantilever of a known probe when scanning the surface of the sample by the probe. Thus, a probe according to the invention can accurately detect the force being applied in a direction vertical to the surface of the sample.

Still additionally, a probe according to the invention is adapted to down-sizing because its displacement is detected by way of piezoresistance.

Still additionally, in a probe according to the invention, a piezoresistor is arranged in the surface of torsion beam means so that the piezoresistor may be placed remotely from the axis of torsion of the torsion beam means to detect the change in the resistance of the piezoresistor by way of the torsional displacement of the torsion beam means. The detection sensitivity of the probe can be improved by arranging the piezoresistor along the lateral outer periphery of the torsion beam means.

Still additionally, in a probe according to the invention, a piezoresistor is buried evenly along the height of torsion beam means so that it is free from any change in the resistance due to the deflection of the torsion beam means that can be produced when the probe is pressed against the sample with excessive force.

Finally, a scanning probe microscope comprising a probe according to the invention can be used to accurately observe the surface profile of a sample. Such a microscope may comprise means for applying a voltage between the tip of the probe and the sample and means for detecting the electric current flowing between the tip and the sample. Then, the scanning probe microscope can detect the electroconductive property of the sample along with the profile thereof.

What is claimed is:

1. A torsion type probe for a scanning probe microscope for detecting the surface profile of a sample comprising:

a supporting block;

torsion beam means supported by said supporting block;

a thin-film plane plate rotatably supported by said torsion beam means;

a tip formed on said thin-film plane plate, wherein said torsion beam means is torsionally rotated about a longitudinal axis with a bending of said thin-film plane plate in a vertical direction; and a piezoresistor arranged in said torsion beam means.

2. A probe according to claim 1, wherein said piezoresistor is formed in a surface of said torsion beam means.

3. A probe according to claim 1, wherein said piezoresistor is formed in a lateral wall of said torsion beam means.

4. A probe according to claim 3, wherein said piezoresistor is evenly buried in said torsion beam means along the height thereof.

5. A probe according to claim 1, wherein said torsion beam means is thin relative to said thin-film plane plate.

6. A probe according to claim 1, wherein said supporting block has thin-film supporting sections supporting said torsion beam means.

7. A probe according to claim 6, wherein said torsion beam means is thin relative to said thin-film supporting sections.

8. A probe according to claim 1, wherein said tip is made of an electroconductive material.

9. A scanning probe microscope for detecting the surface profile of a sample by way of a probe by causing the probe and the sample to scan each other, said microscope comprising:

a probe according to any one of claims 1 through 8;

a scan mechanism for moving the probe and said sample relative to each other to cause them to scan each other; and means for detecting a signal representing the change in the resistance of said piezoresistor, wherein the signal represents the surface profile of the sample.

* * * * *

UNITED STATES PATENT AND TRADEMARK OFFICE
CERTIFICATE OF CORRECTION

PATENT NO. : 6,100,524

DATED : August 8, 2000

INVENTOR(S): TAKAYUKI YAGI, ET AL.

It is certified that error appears in the above-identified patent and that said Letters Patent is hereby corrected as shown below:

[56] REFERENCES CITED:

OTHER PUBLICATIONS, insert --J. Brugger, et al., "Capacitive AFM Microlever With Combined Integrated Sensor/Actuator Functions", The 7$^{th}$ International Conference on Solid-State Sensor and Actuators, pp. 1044-1047 (1993).--

COLUMN 11:

Line 12, "is" should read --is capable of being--.

Signed and Sealed this

Fifteenth Day of May, 2001

Attest:

NICHOLAS P. GODICI

*Attesting Officer*   *Acting Director of the United States Patent and Trademark Office*